United States Patent
Lange

[15] 3,699,642
[45] Oct. 24, 1972

[54] METHOD FOR BONDING SHEET METAL CLADDING TO A BODY

[72] Inventor: Frederick F. Lange, Murrysville, Pa.

[73] Assignee: Westinghouse Electric Corporation, Pittsburgh, Pa.

[22] Filed: April 8, 1971

[21] Appl. No.: 132,378

[52] U.S. Cl. .............................................29/497.5
[51] Int. Cl. .............................................B23s 31/02
[58] Field of Search ............29/497.5, 493, 156.8 B

[56] References Cited

UNITED STATES PATENTS

| | | | |
|---|---|---|---|
| 1,081,618 | 12/1913 | Madden | 29/421 UX |
| 2,932,882 | 4/1960 | Kelly, Jr. | 29/421 X |
| 3,114,961 | 12/1963 | Chambers et al. | 29/156.8 B |
| 3,141,227 | 7/1964 | Klepfer et al. | 29/497.5 X |
| 3,235,958 | 2/1966 | Southron | 29/497.5 X |
| 3,037,883 | 6/1962 | Wachtell et al. | 29/194 X |
| 3,469,062 | 9/1969 | Berkley | 29/492 X |

Primary Examiner—John F. Campbell
Assistant Examiner—Ronald J. Shore
Attorney—F. Shapoe and L. P. Johns

[57] ABSTRACT

A method for applying a cladding to the surface of a body by enclosing the body with a cladding of sheet metal or foil loosely adherent to the body surface in a mass of a non-reactive, non-densifying powder, and compressing the powder at a pressure of greater than about 500 psi and at elevated temperatures up to the melting point of the body or the cladding.

5 Claims, 2 Drawing Figures

PATENTED OCT 24 1972　　3,699,642

METHOD FOR BONDING SHEET METAL CLADDING TO A BODY

CROSS REFERENCE TO RELATED APPLICATION

This application is related to pending application Ser. No. 135,642, filed Apr. 20, 1971.

BACKGROUND OF THE INVENTION

1. Field of the Invention

This invention relates to a method for applying metal cladding to a body and, more particularly, it pertains to the application of foil or sheet cladding to a body having a complex configuration.

2. DESCRIPTION OF THE PRIOR ART

Many techniques exist for cladding metal components with sheet metal to enable the components to resist a corrosive environment. For example, cladding of gas-turbine blades with a more corrosive resistant metal, such as Nichrome, not only increases the life of the blade but also allows higher operating temperatures and therefore more efficient gas-turbine operation. The bonding of sheet metal as cladding to complex shapes such as gas-turbine blades, is considerably more difficult than techniques required to apply such cladding to flat metal surfaces. Inasmuch as gas-turbine blades are used in conditions involving high velocity, high temperature, and corrosive gas streams with large radical stresses, the bonding must not only be reliable with regard to corrosion, it must also be mechanically strong. Such a bond between the cladding and the base metal object is best obtained by diffusion bonding; that is, diffusion of atoms of the cladding material and of the base metal object into each other to form a coherent bond between the cladding material and the base metal object.

In addition, diffusion bonding requires intimate contact between the cladding surface and the base metal surface. For example, for simple shapes such as flat objects for discs, an adequate pressure must be applied at an elevated temperature to promote such diffusion. That is essentially the technique in forming sheet metal stock for silver clad coins and the like. For more complex shapes, such as pre-cast air-foil shapes, the same requirements must be satisfied; there must be intimate contact obtained by pressure and high temperatures for diffusion.

SUMMARY OF THE INVENTION

In accordance with this invention is has been found that the problem of applying a metal cladding to a metal object having a complex configuration is satisfied by the steps of preliminarily attaching a metal cladding to the surface of a metal object to be covered, inserting the assembly of the cladding and metal object into a mass of a powder vehicle comprising sufficient volume to completely enclose the assembly within the chamber of a pressure mold, and applying pressure and heat either simultaneously or otherwise to the powder vehicle in order to press the cladding against all surfaces of the metal object for a sufficient time to diffusion-bond the cladding to the surface of the object.

This method of diffusion-bonding eliminates the prior disadvantages of hot-gas isostatic pressing methods and enables diffusion-bonding of metal cladding to most all components of complex configuration.

DESCRIPTION OF THE PREFERRED EMBODIMENT

Figure 1:
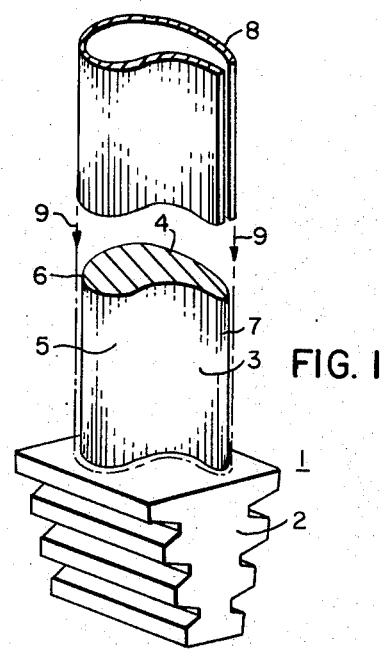
FIG. 1 is a schematic view of an air turbine blade and a sheet metal cladding in position prior to placement on the surface of the blade.

The method of bonding sheet metal cladding to a body having an irregular or complex surface in accordance with this invention is exemplified by describing the manner in which a gas turbine blade is covered with a sheet metal cladding. In FIG. 1 a gas turbine blade, generally indicated at 1, includes a base 2 and a fin or airfoil 3. The airfoil which extends outwardly from one end of the base has a pair of oppositely disposed arcuate surface 4 and 5, a curved edge 6 between said surfaces, and a tapered edge 7. The surface 4 is convex and the surface 5 is concave, whereby said surfaces and edges form a typical fin or airfoil for a turbine blade.

The blade 1 including the base and the fin 3 is normally composed of a metal or a highly densified metal oxide. In operation, it has been found that the arcuate surface 5 is usually susceptible to excessive corrosion and abrasion due to the impact of hot gases upon the surface of the blade. For that reason, it is desirable to provide a cover or protective cladding on the blade surface and to extend the blade life by minimizing the corrosion thereof by the steam.

As shown in FIG. 1, the fin 3 of the blade may be provided with a sheet metal clad 8 by pre-forming a portion of metal sheet or foil of a suitable corrosion resistant material such as an alloy containing about 80 percent nickel and 20 percent chromium and having a thickness of about 3 mils. The clad 8 is pre-formed on a suitable mold after which it is placed on the fin 3 by sliding it downwardly in the direction of the arrows 9 until it completely covers the fin. The blade 1 is then ready for the diffusion-bonding.

Generally, the method of this invention includes the steps of:

1. Pre-forming a cladding of sheet metal for loose attachment to a base member;
2. Placing the pre-form on the base member;
3. Inserting the assembly of the base member and the pre-form into a pressurizing chamber and enclosed therein within a mass of a powder vehicle;
4. Compressing the powder vehicle at a pressure (necessary to cause intimate contact) of from about 500 to 5,000 psi to press the loosely fitting pre-form against the surfaces of the fin; and,
5. Heating the assembly to a temperature below the melting point of the base object and the cladding, and holding the assembly at the indicated pressure and temperature for a time sufficient to bond the cladding to the base.

The blade 1 is preferably composed of an alloy containing a nickel or cobalt base with chromium, such as an alloy commonly designated with the trademark Udimet 500. The sheet metal cladding, being composed of an alloy such as that designated by the trademark Nichrome V, consisting essentially of 80 percent nickel and 20 percent chromium, has a thickness of from about one-half to 15 mils and preferably about 3 mils. The surfaces of the pre-formed clad 8 and fin 3 are preferably cleaned to remove any adherent dirt or oxide immediately prior to their assembly.

Before the assembled clad and fin are inserted into the pressure vessel and furnace they are preferably secured together by the use of adhesive tape or spot welding in order to prevent particles of the powder vehicle from entering any spaces between the cladding and the base during placement of the blade into the furnace.

Figure 2:
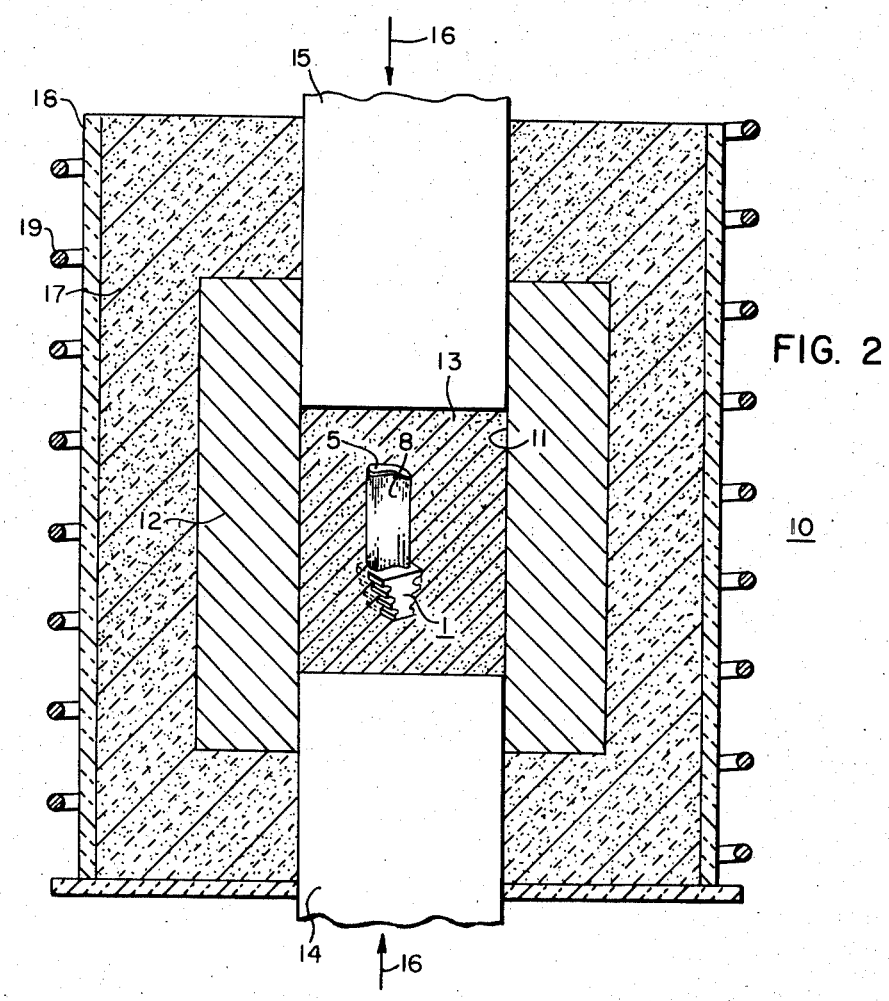
FIG. 2 is a vertical sectional view through a hot pressed furnace in which the sheet metal cladding is diffusion-bonded to the surface of the turbine blade.

As shown in FIG. 2 the blade 1 is placed into a furnace generally indicated at 10 within a chamber 11 of a cylindrical mold 12 which chamber is filled with a powder vehicle 13. The lower end of the chamber 11 is closed by a block or piston 14 and the upper end is similarly closed by a block or piston 15. After the blade 1 is completely enclosed within the powder vehicle 13, pressure is applied to the powder vehicle by the application of pressure through one or both pistons 14 and 15 as shown by the arrows 16. The mold 12 may be composed of graphite where pressures below 3,000 psi are to be applied. Where greater pressures are used, the die is preferably composed of metal such as Nichrome or molybdenum alloy. The mold is completely enclosed in an insulation material 17 which in turn is encased within a quartz cylinder 18. Means for heating the furnace, such as an induction coil 19, are provided externally of the cylinder 18.

The powder vehicle 13 is composed of particles of any material that is non-reactive with the metal parts; namely, the base 1 and the clad 8. For example, the powder vehicle may be composed of particles of SiC, $Al_2O_3$, $ZrO_2$, $TiO_2$, MgO, BN, BeO, NaCl and other metal oxides such as SnO when used below about 1,000° C. In addition, other materials may be used including oxides, carbides, nitrides, borides and silicides of metals, such as single oxides, mixed oxides, intermetallics, and refractory metal powders. The powdered material should be compressible but non-densifying so that it is readily removed from the metal parts after the pressure operation is completed and the assembly removed from the furnace.

In operation, a pressure of up to about 3,000 psi is applied to the powder vehicle 13 through one or both of the pistons 14 and 15. The assembly is then heated to a temperature of about 1,000° C where it is held for a sufficient time such as about 1 hour for diffusion-bonding to commence. Thereafter, the furnace is cooled to room temperature and the assembly removed. During the pressing and heating operations, the furnace atmosphere is preferably a vacuum although a mixture of a forming gas composed of nitrogen and hydrogen may be used. Better bonding strengths are obtained, however, by the use of a vacuum atmosphere.

The pressure applied at various temperatures is dependent upon the thickness of the foil. Where very thin foils such as less then 3 mils and about one-half mil are used, lower pressures such as below 1,000 psi are preferred. However, where cladding having thicknesses of greater than 3 mils, higher pressures such as at least 1,000 psi and up to about 5,000 psi may be necessary.

Although better bonding between the members is obtained with longer times at temperature in the furnace, it has been found that once diffusion begins it continues upon removal of the pressure. Improved diffusion-bonding conditions may be achieved by placing the cladded blade in a hydrogen atmosphere at about 1,000° C for 24 hours.

The following example is exemplary of the invention:

EXAMPLE

A gas turbine blade similar to that shown in FIG. 1 and having a total height of 3 inches is provided with a preformed sheet metal clad by placement of the clad on the fin portion of the blade. The blade is composed of Udimet 500 and the clad is composed of Nichrome V and has a thickness of 3 mils. The loose edges and top end of the cladding are secured together by a pressure adhesive plastic tape to prevent particles of the powder vehicle from seeping therein when the clad blade is placed in a furnace. Subsequently when the furnace is heated, the plastic tape evaporates without damage to the metal parts.

The cladded blade is placed into a die having an inside diameter of 3 inches and a height of 8 inches. A layer of silicon carbide powder is initially placed in the lower portion of the chamber after which the blade is placed therein and centrally of the chamber. The chamber is then filled with silicon carbide powder with the powder vehicle completely enclosing the blade. The upper piston 15 is then inserted in place and a preliminary pressure of 3,000 psi is applied to the powder which pressure is transmitted to all surfaces of the cladding and against the outer surfaces of the fin. The induction coil heats the furnace to a temperature of 1,000° C and is held for a period of 1 hour after which it is cooled to room temperature in the furnace. As a result of the foregoing procedure a cladded fin for a gas turbine blade is provided having a satisfactory degree of thermal diffusion for providing corrosion resistance to the base material of the fin during its use as a turbine blade.

In this manner, any complex shape can be cladded by diffusion bonding.

What is claimed is:

1. A method for diffusion bonding sheet metal cladding to a base member comprising the steps of mounting a pre-formed sheet metal cladding in place on a metal base member, placing the cladded base member into a pressure chamber, enclosing the cladded base member in a powder of a non-reactive material selected from a group consisting of a metal oxide, metal carbide, metal nitrides, and metal borides, applying a pressure of at least 500 psi to the powder to isostatically transmit the pressure uniformly to the cladding and against the surfaces of the base, heating the assembly of the cladded base member and powder to an elevated temperature at least that at which diffusion takes place between contacting surfaces in a reasonable time period but less than the melting points of the metal cladding and the base member, and holding the pressure and temperature conditions for a sufficient time to diffusion bond at least a portion of the cladding and base together.

2. The method of claim 1 in which the pressure is applied from about 1,000 psi to about 5,000 psi.

3. The method of claim 1 in which the cladded base member is heated at a temperature of from about 600° C to about 1,000° C.

4. The method of claim 1 in which the pressure transmitting powder is at least one of the materials selected from a group consisting of SiC, $Al_2O_3$, $TiO_2$, $ZrO_2$, MgO, BN, BeO, NaCl, and $Si_3N_4$.

5. The method of claim 1 in which the powder is a non-reactive, non-densifying metal oxide.

* * * * *